United States Patent
Fattal

(10) Patent No.: US 11,418,775 B2
(45) Date of Patent: Aug. 16, 2022

(54) MULTIVIEW DISPLAY, SYSTEM, AND METHOD HAVING SHIFTABLE CONVERGENCE PLANE

(71) Applicant: LEIA INC., Menlo Park, CA (US)

(72) Inventor: David A. Fattal, Menlo Park, CA (US)

(73) Assignee: LEIA INC., Menlo Park, CA (US)

(*) Notice: Subject to any disclaimer, the term of this patent is extended or adjusted under 35 U.S.C. 154(b) by 0 days.

(21) Appl. No.: 17/346,121

(22) Filed: Jun. 11, 2021

(65) Prior Publication Data
US 2021/0306619 A1    Sep. 30, 2021

Related U.S. Application Data

(63) Continuation of application No. PCT/US2018/066952, filed on Dec. 20, 2018.

(51) Int. Cl.
H04N 13/32    (2018.01)
H04N 13/373    (2018.01)

(52) U.S. Cl.
CPC ........... *H04N 13/32* (2018.05); *H04N 13/373* (2018.05)

(58) Field of Classification Search
USPC .......................................................... 348/51
See application file for complete search history.

(56) References Cited

U.S. PATENT DOCUMENTS

| | | | |
|---|---|---|---|
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,551,546 B2 | 2/2020 | Fattal | |
| 10,649,128 B2 | 5/2020 | Fattal et al. | |
| 10,798,371 B2 | 10/2020 | Fattal | |
| 10,802,212 B2 | 10/2020 | Fattal | |
| 10,810,917 B2 | 10/2020 | Fattal | |
| 10,830,939 B2 | 11/2020 | Fattal et al. | |

(Continued)

FOREIGN PATENT DOCUMENTS

| JP | 2002228979 A | 8/2002 |
|---|---|---|
| JP | 2010008719 A | 1/2010 |

(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

(Continued)

*Primary Examiner* — Behrooz M Senfi
(74) *Attorney, Agent, or Firm* — J. Michael Johnson

(57) ABSTRACT

A multiview display includes a multiview backlight configured to emit directional light beams configured to converge at points within a convergence plane, and an array of light valves configured to modulate the directional light beams at the convergence plane. A distance between the multiview backlight and the light valve array is configured to be adjustable to shift a corresponding location of the convergence plane relative to the multiview display.

20 Claims, 5 Drawing Sheets

(56) References Cited

U.S. PATENT DOCUMENTS

| | | |
|---|---|---|
| 10,838,134 B2 | 11/2020 | Fattal et al. |
| 10,884,175 B2 | 1/2021 | Fattal |
| 10,928,564 B2 | 2/2021 | Fattal |
| 10,928,677 B2 | 2/2021 | Meta et al. |
| 11,011,121 B2 | 5/2021 | Fattal et al. |
| 11,016,235 B2 | 5/2021 | Fattal et al. |
| 2008/0174519 A1* | 7/2008 | Shieh .................. G09G 3/344 345/55 |
| 2009/0322986 A1 | 12/2009 | Wei et al. |
| 2012/0200807 A1 | 8/2012 | Wei et al. |
| 2012/0274556 A1 | 11/2012 | Sugiyama et al. |
| 2013/0169518 A1 | 7/2013 | Wu et al. |
| 2015/0268399 A1 | 9/2015 | Futterer |
| 2017/0070728 A1* | 3/2017 | Kim ................... H04N 13/305 |
| 2017/0363794 A1 | 12/2017 | Wan et al. |
| 2018/0095528 A1* | 4/2018 | Tao ..................... G06F 40/103 |
| 2018/0278923 A1* | 9/2018 | Fattal .................. G02B 6/005 |
| 2018/0306965 A1* | 10/2018 | Fattal ................. G02B 6/0036 |
| 2019/0302336 A1 | 10/2019 | Fattal et al. |
| 2019/0302340 A1 | 10/2019 | Ma et al. |
| 2019/0339452 A1 | 11/2019 | Fattal et al. |
| 2020/0049878 A1* | 2/2020 | Fattal ................. G02B 6/0036 |
| 2020/0301165 A1 | 9/2020 | Fattal |
| 2020/0310135 A1 | 10/2020 | Fattal |

FOREIGN PATENT DOCUMENTS

| | | |
|---|---|---|
| JP | 2013153421 A | 8/2013 |
| WO | 2012038856 A1 | 3/2012 |
| WO | 2018208309 A1 | 11/2018 |
| WO | 2018213100 A1 | 11/2018 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal at Display Technology, Sep. 2005, pp. 125-140, vol. 1, No. 1.

International Search Report and Written Opinion (ISRWO) by International Searching Authority (ISA) Korean Intellectual Property Office (KIPO) dated Sep. 19, 2019 (15 pages) for foreign counterpart parent International (PCT) Application No. PCT/US2018/066952.

* cited by examiner

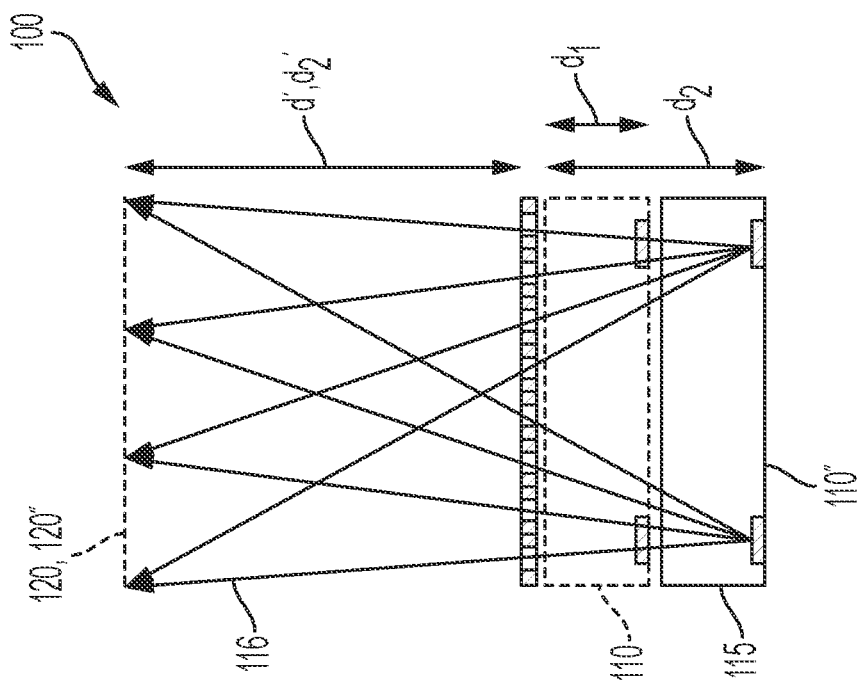
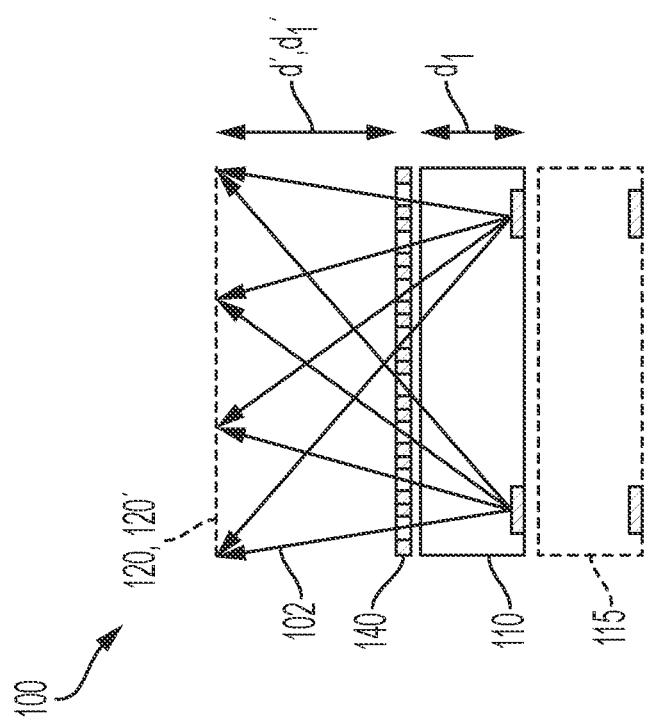

MULTIVIEW DISPLAY, SYSTEM, AND METHOD HAVING SHIFTABLE CONVERGENCE PLANE

CROSS-REFERENCE TO RELATED APPLICATIONS

This application is a continuation application of and claims the benefit of priority to International Patent Application No. PCT/US2018/066952, filed Dec. 20, 2018, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIGS. 3A and 3B illustrate a multiview display comprising two multiview backlights in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview display employing an adjustable convergence plane with application to electronic displays. In various embodiments consistent with the principles herein, a multiview display is provided. The multiview display is configured to emit directional light beams configured to converge at a point within a convergence plane corresponding to different views of the multiview image. A distance between a multiview backlight and a light valve array of the multiview display is configured to be adjustable to shift a corresponding location of the convergence place relative to the multiview display.

Figure 1A:
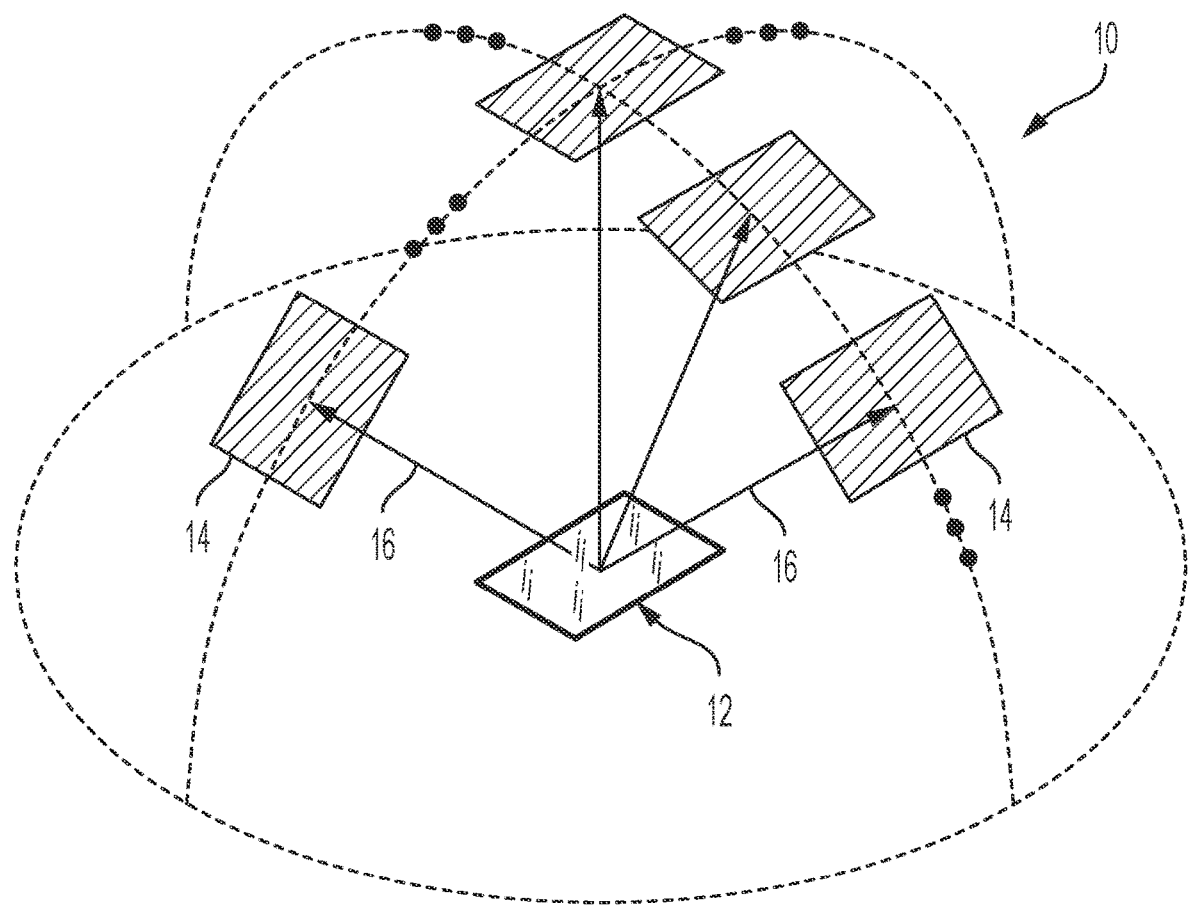
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\gamma$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\gamma$ is an angle in a horizontal plane (e.g., parallel to the multiview display screen plane).

Figure 1B:
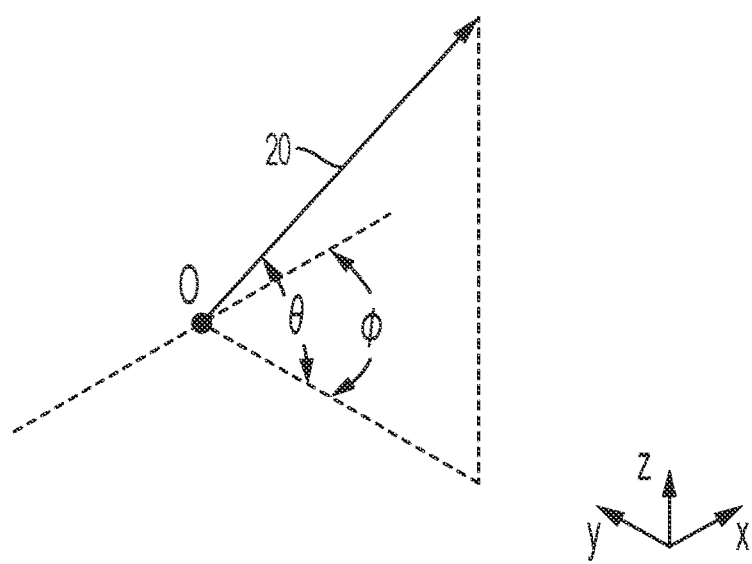
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described below with respect to FIG. 1B.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Further, as used herein, the article 'a' is intended to have its ordinary meaning in the patent arts, namely 'one or more'. For example, 'a light valve' means one or more light valves and as such, 'the light valve' means 'light valves(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2B:
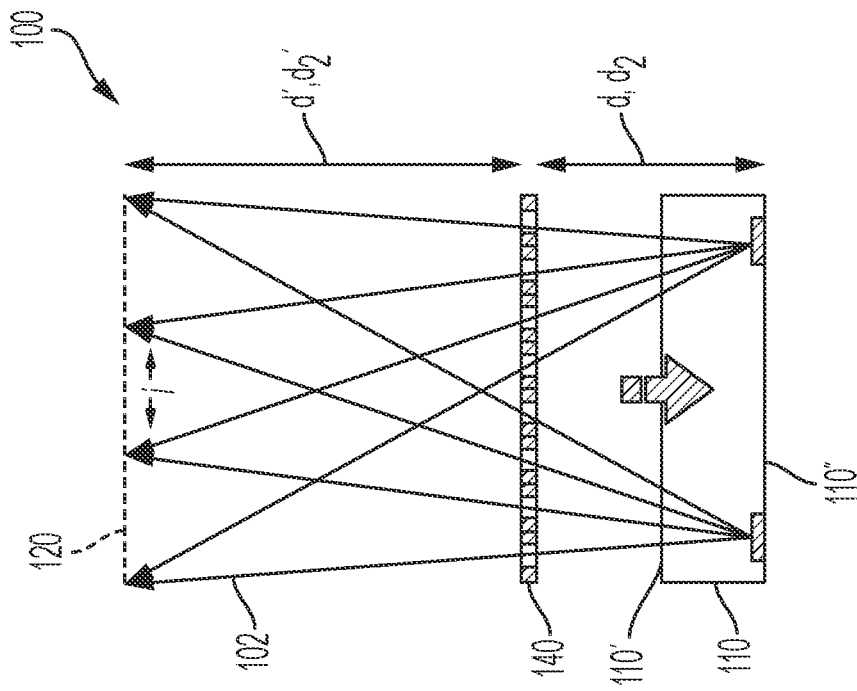
FIGS. 2A and 2B illustrate side views of a multiview display in an example, according an embodiment consistent with the principles described herein.
Figure 2A:
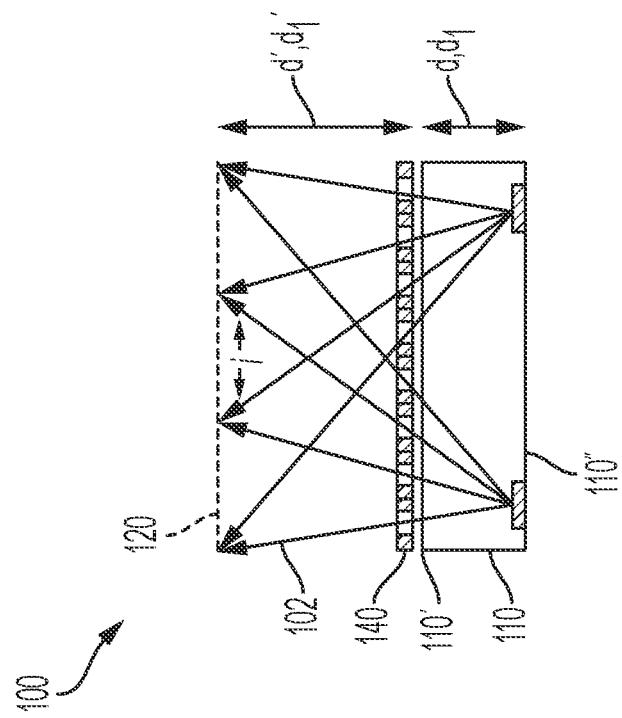

According to some embodiments of the principles described herein, a multiview display is provided. FIGS. 2A and 2B illustrate side views of a multiview display 100 in an example, according an embodiment consistent with the principles described herein. The multiview display 100 comprises a multiview backlight 110. The multiview backlight 110 is configured to emit light as directional light beams 102 having different principal angular directions. The different principal angular directions of the directional light beams 102 correspond to respective different view directions of a multiview image. FIGS. 2A and 2B illustrate the directional light beams 102 as a plurality of diverging arrows depicted being directed away from the second (or bottom) surface 110" of the multiview backlight 110. In particular, the direction light beams are configured to converge at points within a convergence plane 120 corresponding to locations of different views of the multiview image. The convergence plane 120 represents the optimal viewing location for a user. Specially, the convergence plane 120 represents the plane in which the user's eyes should be located to obtain an optimal view of the multiview image. As illustrated in FIGS. 2A and 2B, the convergence plane 120 is a plane parallel to the first (or top) surface 110' of the multiview backlight 110.

The multiview display 100 further comprises an array of light valves 140. In various embodiments, different types of light valves may be employed as the light valves 140 of the light valve array including, but not limited to, one or more of liquid crystal light valves, electrophoretic light valves, and light valves based on electrowetting. The array of light valves 140 is configured to modulate the directional light beams 102 as the different views of the multiview image at the convergence plane 120.

A distance d between the multiview backlight 110 and the array of light valves 140 is configured to be adjustable to shift a corresponding location of the convergence plane 120 relative to the multiview display 100. FIG. 2B illustrates a side view of a multiview display 100 having a shifted convergence plane 120 in relation to FIG. 2A in an example, according to an embodiment consistent with the principles described herein. In the illustrated figures, the distance d represents the distance between the bottom surface 110" of the multiview backlight 110 that emits the directional light beams 102, and the light valve 140. In other embodiments, the distance d may represent the distance between the top surface 110' of the multiview backlight 110 and the array of light valves 140. Returning to FIG. 2B, the distance d between the multiview backlight 110 and the array of light valves 140 has been adjusted from a smaller distance $d_1$ as depicted in FIG. 2A to a greater distance $d_2$ as depicted in FIG. 2B. Correspondingly, the location d' of the convergence plane 120 relative to the multiview display 100 has shifted from a distance $d_1'$ from the multiview display 100 to a distance $d_2'$ from the multiview display 100. The distance d' between the convergence plane 120 and the multiview display 100 may thus be increased to move the convergence plane 120 further away from the multiview display 100, or decreased to bring the convergence plane 120 closer to the multiview display 100.

As the convergence plane 120 represents the optimal viewing position for the multiview image in any configuration, shifting the convergence plane 120 up or down from the multiview display 100 as illustrated in FIGS. 2A and 2B preserves attributes of the multiview image between the different locations of the convergence plane 120. In particular, an inter-view spacing i between the different views of the multiview image is configured to be constant as function of the adjustable distance d between the multiview backlight 110 and the light valves 140 of the light valve array. Equivalently, the inter-view distance i is also configured to be constant as function of the corresponding locations d' (e.g., $d_1'$ and $d_2'$) of the convergence plane 120 relative to the multiview display 100. Thus, as illustrated in FIGS. 2A and 2B, the distance i between views of the multiview image is the same in the convergence plane 120 of FIG. 2A located at distance $d_1'$ from the multiview display 100, as in the convergence plane 120 of FIG. 2B located at distance $d_2'$ from the multiview display 100.

The inter-view spacing i at the convergence plane 120 is commensurate with an inter-ocular distance for a user of the multiview display 100. This features makes the convergence plane 120 the optimal viewing distance for the user. As the convergence plane 120 is moved as previously described, the distance i between views remains commensurate with the distance between the user's eyes, ensuring that the user can continue to view a three-dimensional image provided by the combination of two different views (one for each eye) at each location of the convergence plane 120.

The distance d between the multiview backlight 110 and the array of light valves 140 may be adjusted in various ways. In some embodiments, the adjustment may comprise a mechanical motion of the multiview backlight 110 relative to the array of light valves 140. The mechanical motion may be produced by a mechanical, electrical, electromechanical, or other type of actuator configured to move the multiview backlight 110 away from or closer to the light valve array.

In some embodiments, the distance between a multiview backlight of the multiview display and the array of light valves 140 may be adjusted using multiple multiview backlights. FIGS. 3A and 3B illustrate a multiview display 100 comprising a pair of multiview backlights in an example, according to an embodiment consistent with the principles described herein. In particular, as illustrated in FIGS. 3A-3B, the multiview backlight 110 is a first multiview backlight 110 of the multiview backlight pair. The first multiview backlight 110 is located adjacent to the array of light valves 140, as illustrated. The multiview display 100 illustrated in FIGS. 3A-3B further comprises a second multiview backlight 115 of the pair of multiview backlights. The second multiview backlight 115 is located on the side of the first multiview backlight 110 opposite to the side of the first multiview backlight 110 adjacent to the light valve 140. The first multiview backlight 110 is thus located between the second multiview backlight 115 and the array of light valves 140 of the multiview display 100. Further, the first and second multiview backlights 110, 115 have different locations relative to the light valve array, as illustrated.

According to various embodiments, the second multiview backlight 115 may be substantially similar to the multiview backlight 110, described above. In particular, the second multiview backlight 115 is configured to provide directional light beams 116 that converge within a second convergence plane 120" at points corresponding locations of the different views of the multiview image at the second convergence plane 120". Further, the first multiview backlight 110 is transparent to the directional light beams 116 provided by the second multiview backlight 115. Accordingly, the directional light beams 116 provided by the second multiview backlight 115 are emitted through a thickness of the first multiview backlight 110 to be modulated as directional emitted light by the array of light valves 140.

The multiview backlights of the multiview display 100 of FIGS. 3A and 3B may be selectively activated (one at a time) to provide the multiview image. Because the first and second multiview backlights 110, 115 are located at different distances $d_1$ and $d_2$ from the array of light valves 140, the selective activation of each of the first and second multiview backlights 110, 115 varies the distance d between a multiview backlight and the light valves 140 of the light valve array. Since, as previously described, adjusting the distance d between the light valve array and a backlight of the multiview display 100 shifts the distance d' of the convergence plane 120 from the light valve array, the selective activation of the first and second multiview backlights 110, 115 shifts the distance d' of the convergence plane 120.

FIGS. 3A and 3B illustrate the selective activation of the first and second multiview backlights 110, 115 of the multiview display 100, and the resulting shift of the convergence plane 120 of the multiview display 100 from a distance $d_1'$ to a distance $d_2'$. In both figures, an active backlight is depicted with solid lines and the inactive backlight is depicted with dashed lines. Thus, referring again to FIG. 3A, the first multiview backlight 110 is active, as illustrated, whereas the second multiview backlight 115 is inactive. Accordingly, the distance the active, first multiview backlight 110 and the light valve 140 is $d_1$ and correspondingly, the convergence plane 120 of the multiview display is a first convergence plane 120' corresponding to the active, first multiview backlight 110. Further, the first convergence plane 120' is located at a distance $d_1'$ from the light valve 140 in FIG. 3A.

In FIG. 3B, the first multiview backlight 110 is deactivated, whereas the second multiview backlight 115 is active. Accordingly, the distance between the active, second multiview backlight 115 and the light valve array is $d_2$. In turn, the convergence plane 120 of the multiview display 100 has now shifted to a second convergence plane 120" resulting from the distance $d_2$ between the active, second multiview backlight 115 and the light valve array. Moreover, as illustrated, a location of the second convergence plane 120" relative to the multiview display 100 is different from a location of the first convergence plane 120', according to various embodiments. That is the distance $d_2'$ differs from the distance $d_1'$ by virtue of the selective activation of either the first multiview backlight 110 or the second multiview backlight 115.

Figure 4:
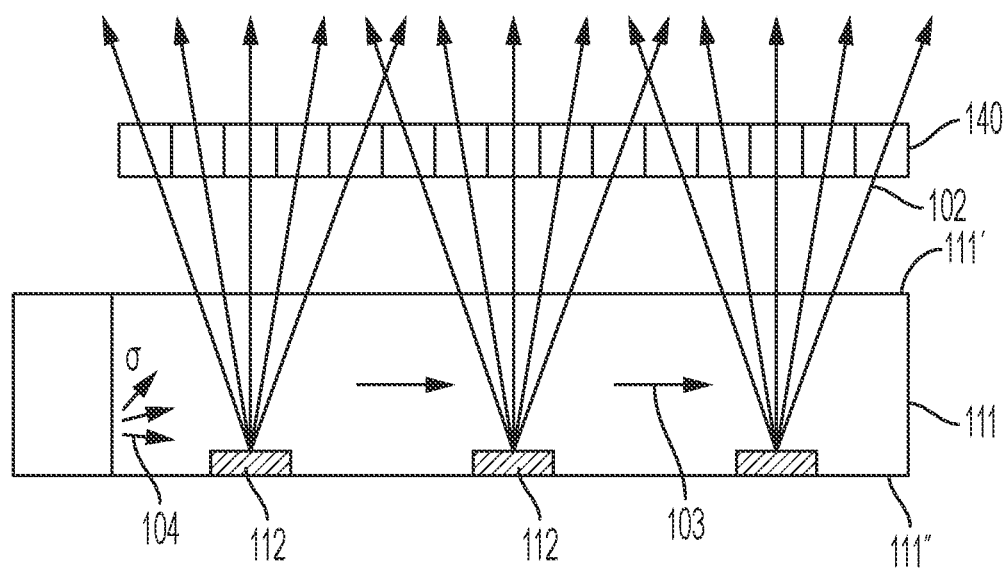
FIG. 4 illustrates a multiview display comprising a multiview backlight comprising a light guide in an example, according to an embodiment consistent with the principles described herein.

In some embodiments, the multiview backlight 110 comprises a light guide 111. FIG. 4 illustrates a multiview display 100 comprising a multiview backlight 110 comprising a light guide 111 in an example, according to an embodiment consistent with the principles described herein. The light guide 111 is configured to guide light along a length of the light guide as guided light 104 (i.e., a guided light beam 104). For example, the light guide 111 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 111, for example.

In some embodiments, the light guide 111 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 111 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly (methyl methacrylate) or 'acrylic glass', polycarbonate, etc.). In some examples, the light guide 111 may further include a cladding layer (not illustrated) on at least a portion of a surface (e.g., one or both of the first surface and the second surface) of the light guide 111. The cladding layer may be used to further facilitate total internal reflection, according to some examples.

Further, according to some embodiments, the light guide 111 is configured to guide the guided light 104 according to total internal reflection at a non-zero propagation angle between a first surface 111' (e.g., front or top surface or side) and a second surface 111" (e.g., back or bottom surface or side) of the light guide 111. In particular, the guided light 104 propagates by reflecting or 'bouncing' between the first surface 111' and the second surface 111" of the light guide 111 at the non-zero propagation angle. In some embodiments, the guided light 104 may comprise a plurality of guided light beams having different colors of light. Guided light beams of the guided light beam plurality having the different colors of light may be guided by the light guide 111 at respective ones of different color-specific, non-zero propagation angles. Note, the non-zero propagation angle is not illustrated in FIG. 4 for simplicity of illustration. However, a bold arrow depicting a propagation direction 103 illustrates a general propagation direction of the guided light 104 along the light guide length in FIG. 4.

The multiview backlight 110 further comprises a plurality of multibeam elements 112. The multibeam elements 112 of the plurality are spaced apart from one another along the light guide length. The multibeam elements 112 of the plurality may be located at or adjacent to a first (or "top") surface 111' of the light guide 111. In some embodiments, the plurality of multibeam elements 112 may be located on a second (or "bottom") surface 111" of the light guide 111, for example, as illustrated in FIG. 4. In some embodiments, the multibeam elements 112 of the plurality may be located inside the light guide 111 between the first surface 111' and the second surface 111".

The multibeam element 112 of the multiview backlight 110 is configured to scatter out light from the light guide 111 as the plurality of directional light beams having principal angular directions corresponding to view directions of a multiview image. According to various embodiments, the multibeam element 112 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 112 comprising a diffraction grating is configured to diffractively scatter out the guided light portion as the plurality of directional light beams having the different principal angular directions. In other embodiments, the multibeam element 112 comprising a micro-reflective element is configured to reflectively scatter out the guided light portion as the plurality of directional light beams, or the multibeam element 112 comprising a micro-refractive element is configured to scatter out the guided light portion as the plurality of directional light beams by or using refraction (i.e., refractively scatter out the guided light portion).

In some embodiments, a size of the multibeam element 112 is comparable to a size of a light valve 140 of the multiview display 100. Herein, the 'size' may be defined in any of a variety of manners to include, but not be limited to, a length, a width or an area. For example, the size of a light valve 140 may be a length thereof and the comparable size of the multibeam element 112 may also be a length of the multibeam element 112. In another example, size may refer to an area such that an area of the multibeam element 112 may be comparable to an area of the light valve 140.

In some embodiments, a head tracker may be employed with the multiview display 100 as part of a multiview display system. The head tracker is configured to determine a distance between the multiview display 100 and a user. For example, the head tracker may be configured to determine a distance between the multiview display 100 and the head of the user, or more specifically, a distance between the multiview display 100 and one or both eyes of a user. Using the determined distance between the multiview display 100 and the user, the multiview display system may adjust the distance between the multiview backlight 110 and the array of light valves 140 to shift the convergence plane to the level of the user's eyes according to the principles described herein. The multiview display system may thus adjust the convergence plane based on the motion of the user to follow the user's eyes and ensure an optimal viewing experience.

According to various embodiments, any of a variety of devices, systems and circuits that provide head tracking (or equivalently tracking of a user's position) may be employed as the head tracker of the multiview display system. For example, in some embodiments, the head tracker may comprise a camera configured to capture an image of the user relative to the screen of the multiview display 100. Further, the head tracker may comprise an image processor (or general purpose computer programmed as an image processor) configured to determine a position of the user within the captured image relative to the screen of the multiview display 100. The user's position relative to the screen of the multiview display 100 may be determined from the captured image by the image processor using various techniques including, but not limited to, image recognition or pattern matching, for example. An output of the head tracker may be used to modify an operation of the multiview display system. For example, the determined position of the user may be provided to an actuator to adjust the distance d between the multiview backlight 110 and the array of light valves 140 of the multiview display 100 of FIGS. 2A and 2B. In another example, the determined position of the user may be provided to the multiview display 100 of FIGS. 3A and 3A to selectively activate and/or deactivate one of the first multiview backlight 110 and the second multiview backlight 115. Other examples of the head tracker implementations may include any of a variety of two-dimensional (2D) and three-dimension (3D) object tracking systems.

Figure 5:
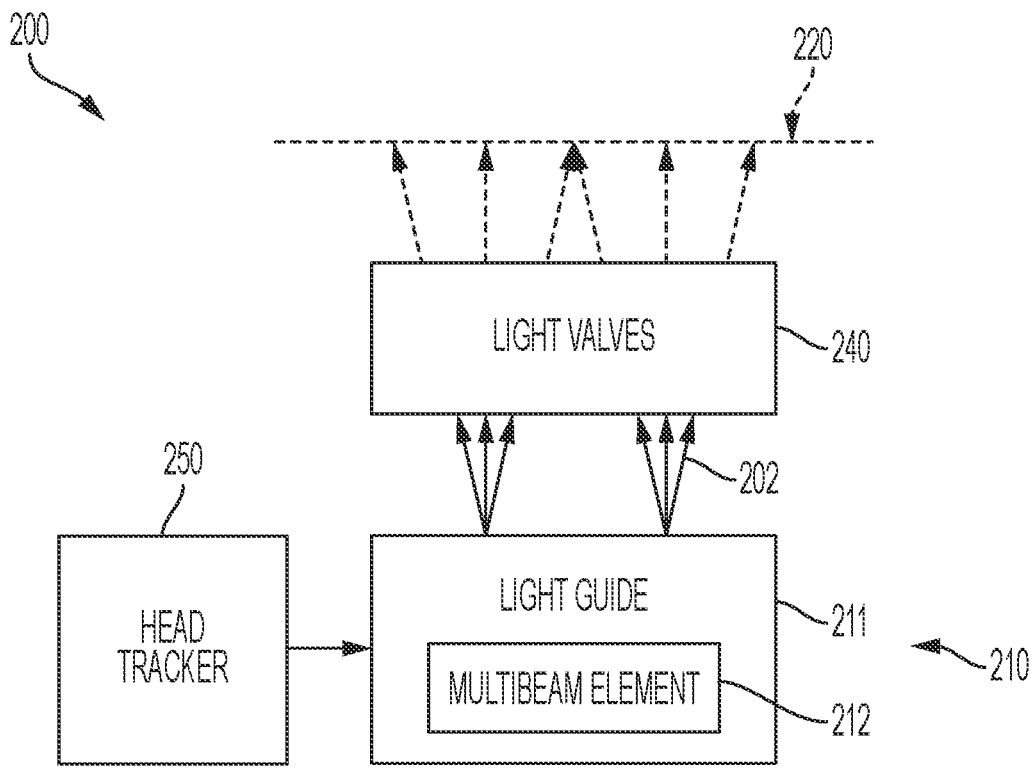
FIG. 5 illustrates a block diagram of a multiview display system in an example, according to an embodiment consistent with the principles described herein.

In accordance with some embodiments of the principles described herein, a multiview display system 200 is provided. FIG. 5 illustrates a block diagram of a multiview display system 200 in an example, according to an embodiment consistent with the principles described herein. The multiview display system 200 comprises a multiview backlight 210. The multiview backlight 210 is substantially similar to the multiview backlight 110 of the multiview display 100, previously described. As such, the multiview backlight 210 is configured to provide directional light beams 202 having different principal angular directions corresponding to respective different view directions of different views of a multiview image. The multiview backlight 210 may be shaped as a 'slab' or substantially flat block of substrate comprising two substantially parallel and opposite planar surfaces (i.e., a top and a bottom surface).

The multiview display system 200 further comprises an array of light valves 240. The array of light valves 240 is substantially similar to the array of light valves 140 of the multiview display 100, previously described. As such, different types of light valves may be employed as the light valves of the light valve array including, but not limited to, one or more of liquid crystal light valves, electrophoretic light valves, and light valves based on electrowetting. The array of light valves 240 is configured to modulate the directional light beams to provide the multiview image at a convergence plane 220 of the multiview display system. The convergence plane 220 is a plane parallel to the light valve array and represents the optimal viewing location for a user. Specially, the convergence plane 220 represents the plane in which the user's eyes should be located to obtain an optimal view of the multiview image.

The multiview display system 200 further comprises a head tracker 250. The head tracker 250 is substantially similar to the head tracker employed with the multiview display 100, previously described. As such, the head tracker 250 is configured to determine a distance of a user from the multiview display system 200. Any of a variety of devices, systems and circuits that provide head tracking may be employed as the head tracker of the multiview display system 200, including any of a variety of two-dimensional (2D) and three-dimensional (3D) head-tracking systems. For example, the head tracker 250 may comprise one or both of a plurality of cameras configured to determine user distance using disparity estimation and a time-of-flight sensor configured to determine distance using a propagation time of a signal reflected by the user. The signal emitted by the time-of-flight sensor may include, but is not limited to, an acoustic signal (e.g., acoustic range finder) and an optical signal (e.g., emitted by a laser). In another example, the head tracker 250 may comprise an optical sensor configured to measure the distance to the plurality of points using laser light reflected from one or more objects in a region that is scanned. For example, the head tracker 250 may comprise an Intel RealSense® 3D camera that combines a 2D camera, a second infrared camera and an infrared laser projector. The 2D camera is configured to capture a 2D image of the scanned region, while the infrared laser projector and the second infrared camera work cooperatively as the distance sensor to collect distance information within the scanned region. Intel RealSense® and Intel® are registered trademarks of Intel Corporation, Santa Clara, Calif., USA.

A distance between the multiview backlight 210 and the light valve array 280 is configured to be adjustable according to the determined user distance to shift a location of the convergence plane 220 to correspond to the determined user distance. The shift of the convergence plane 220 based on the distance of the user from the multiview backlight 210 operates substantially as illustrated in FIGS. 2A and 2B and described in relation to the multiview display 100. In particular, the distance between the multiview backlight 210 and the array of light valves 240 is increased to increase the distance between the convergence plane 220 and the light valve array. Similarly, the distance between the multiview backlight 210 and the light valve array is decreased to decrease the distance between the convergence plane 220 and the array of light valves.

As the convergence plane 220 represents the optimal viewing position for the multiview image in any configuration, shifting the convergence plane 220 up or down from the multiview display 100 as illustrated in FIGS. 2A and 2B preserves attributes of the multiview image between the different locations of the convergence plane 220. In particular, an inter-view spacing of the different views at the convergence plane 220 is configured to be constant as the convergence plane 220 is shifted. In addition, the inter-view spacing within the convergence plane 220 is commensurate with an inter-ocular distance for the user. As a result, a user of the multiview display system 200 whose eyes are maintained on the convergence plane 220 even as the convergence plane 220 changes locations may have a substantially similar viewing experience across the various locations of the convergence plane 220.

In some embodiments, the multiview display system 200 comprises multiple multiview backlights. The multiview display system comprising multiple multiview backlights is substantially similar to the multiview display 100 of FIGS. 3A and 3B. As such, the first multiview backlight is located at a first distance from the array of light valves 240 and a second multiview backlight is located at a second distance from the light valve array, the second distance being different from the first distance. In particular, the first multiview backlight is located between the light valve array and the second multiview backlight. Because each multiview backlight light located at a different distance from the array of light valves 240, the convergence plane 220 of the multiview display system 200 has a location that depends on which multiview backlight is active. Accordingly, to shift the location of the convergence plane 220, one of the first and the second multiview backlight is selectively activated.

In some embodiments, the multiview backlight 210 comprises a light guide 211. The light guide 211 is configured to guide light in a propagation direction along a length of the light guide as guided light. The light guide 211 may be substantially similar to the light guide 111 of the multiview display 100, previously described. According to various embodiments, the light guide 211 may be configured to guide the guided light using total internal reflection. Further, the guided light may be guided at a non-zero propagation angle by or within the light guide 211. In some embodiments, the guided light may be collimated or may be a collimated light beam. In particular, the guided light may be collimated according to or having a collimation factor σ, in various embodiments.

The multiview backlight 210 further comprise a plurality of multibeam elements 212 spaced apart from one another along the light guide length. The multibeam elements 212 of the plurality are substantially similar to the multibeam elements 112 of the multiview display 100, previously described. The multibeam elements 212 of the plurality are configured to scatter out a portion of the guided light as directional emitted light associated with the multiview display system 200. The directional emitted light comprises a plurality of directional light beams 202 having principal angular directions corresponding to respective different view directions of the multiview display system 200. The multibeam elements 212 of the plurality may be located on surface of or within the light guide 211.

One or more of a size of the multibeam element of the multibeam element plurality is comparable to a size of a light valve 240 of the light valve array. In some embodiments, the size of the multibeam element 212 is comparable to the light valve size such that the multibeam element size is between about fifty percent (50%) and about two hundred percent (200%) of the light valve size.

Figure 6:
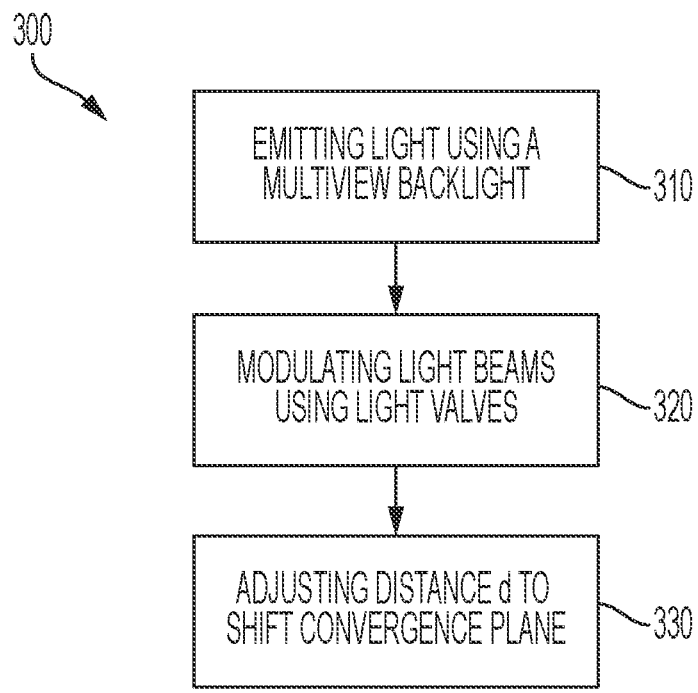
FIG. 6 illustrates a flowchart of the method of multiview display operation in an example, according to an embodiment consistent with the principles described herein.

In accordance with some embodiments of the principles described herein, a method 300 of multiview display operation is disclosed. FIG. 6 illustrates a flowchart of the method 300 of multiview display operation in an example, according to an embodiment consistent with the principles described herein. The method 300 comprises emitting 310 light using a multiview backlight as directional light beams having different principal angular directions corresponding to respective different view directions of a multiview image. The multiview backlight is substantially similar to the multiview backlight 110 of the multiview display 100, previously described. The directional light beams converge at points within a convergence plane corresponding to location of different views of the multiview image. The convergence plane is a plane parallel to the multiview backlight and represents the optimal viewing location for a user. Specifically, the convergence plane represents the plane in which the user's eyes should be located to obtain an optimal view of the multiview image.

The method 300 further comprises modulating 320 the directional light beams using an array of light valves to provide the different views of the multiview image at the convergence plane. The array of light valves is substantially similar to the array of light valves 140 of the multiview display 100, previously described. As such, different types of light valves may be employed as the light valves of the light valve array including, but not limited to, one or more of liquid crystal light valves, electrophoretic light valves, and light valves based on electrowetting. Different ones of the directional light beams having different principal angular directions are configured to pass through and be modulated by different ones of the light valves in the light valve array.

The method 300 further comprises adjusting 330 a distance between the multiview backlight and the light valve array to shift a location of the convergence plane relative to the multiview display. The shift of the location of the convergence plane based on adjusting the distance between the multiview backlight and the light valve array operates substantially as illustrated in FIGS. 2A and 2B and described in relation to the multiview display 100. In particular, the distance between the multiview backlight and the light valve array is increased to increase the distance between the convergence plane and the multiview display. Similarly, the distance between the multiview backlight and the light valve array is decreased to decrease the distance between the convergence plane and the multiview display.

In some embodiments, emitting 310 light using a multiview backlight comprises guiding light in a light guide as guided light. The light may be guided at a non-zero propagation angle between opposite internal surfaces of the light guide. Emitting 310 light using the multiview backlight further comprises scattering a portion of the guided light out of the light guide as the directional light beams using an array of multibeam elements. A multibeam element of the array may be substantially similar to the multibeam element 122 of the multiview display 100. As such, the multibeam element may comprise one or more of a diffraction grating configured to diffractively scatter out the portion of the guided light, a micro-reflective structure configured to reflectively scatter out the portion of the guided light, and a micro-refractive structure configured to refractively scatter out the portion of the guided light. Further, the multibeam element may have a size comparable to a size of a light valve of the light valve array.

In some embodiments, adjusting the distance between the multiview backlight and the light valve array comprises mechanically moving the multiview backlight relative to the light valve array. The mechanical motion may be produced by a mechanical, electrical, electromechanical, or other type of actuator configured to move the multiview backlight away from or closer to the light valve array.

In some embodiments, the method 300 further comprises determining a distance of a user from the multiview display using a head tracker and adjusting the distance between the multiview backlight and the light valve array to shift the convergence plane location to correspond to the determined user distance. The head tracker may be substantially similar to the head tracker of multiview display 100, previously described. Thus, any of a variety of devices, systems and circuits that provide head tracking may be employed as the head tracker of the multiview display, including any of a variety of two-dimensional and three-dimensional head-tracking systems. Further, an output of the head tracker may be used to modify an operation of the multiview display. For example, the determined position of the user may be provided to an actuator to adjust the distance between the multiview backlight and the light valve array of the multiview display (or to selectively activate one or multiple multiview backlights in a multiview display) to shift the convergence plane.

In some embodiments, determining the distance of the user from the multiview display using a head tracker may comprise one or both of capturing an image of the user using a plurality of cameras and employing disparity estimation to determine the distance of the user from the multiview display, and employing a time-of-flight sensor to determine the distance of the user from the multiview display from a propagation time of a signal emitted by the time-of-flight sensor and reflected by the user. The signal emitted by the time-of-flight sensor may include, but is not limited to, an acoustic signal and an optical signal (e.g., emitted by a laser).

Thus, there have been described examples and embodiments of a multiview display and method of multiview display operation having an adjustable convergence plane. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
   a multiview backlight configured to emit light as directional light beams having different principal angular directions corresponding to respective different view directions of a multiview image, the directional light beams being configured to converge at points within a convergence plane corresponding to locations of different views of the multiview image; and
   an array of light valves configured to modulate the directional light beams as the different views of the multiview image at the convergence plane,
   wherein a distance between the multiview backlight and the light valve array is configured to be adjustable to shift a corresponding location of the convergence plane relative to the multiview display.

2. The multiview display of claim 1, wherein an inter-view spacing between the different views of the multiview image is configured to be constant as function of the adjustable distance between the multiview backlight and the light valves array and the corresponding location of the convergence plane.

3. The multiview display of claim 2, wherein the inter-view spacing at the convergence plane is commensurate with an inter-ocular distance for a user of the multiview display.

4. The multiview display of claim 1, wherein an adjustment of the distance between the multiview backlight and the light valve array comprises a mechanical motion of the multiview backlight relative to the light valve array.

5. The multiview display of claim 1, wherein the multiview backlight is a first multiview backlight and the convergence plane is a first convergence plane of the multiview display, the multiview display further comprising a second multiview backlight configured to provide directional light beams that converge within a second convergence plane at points corresponding locations of the different views of the multiview image at the second convergence plane, a location of the second convergence plane relative to the multiview display being different from a location of the first convergence plane.

6. The multiview display of claim 5, wherein the first multiview backlight is located between the second multiview backlight and the light valve array, the first multiview backlight being transparent to the directional light beams provided by the second multiview backlight, and wherein an adjustment of the distance between the multiview backlight and the light valve array comprises a selectively activated one of the first multiview backlight and the second multiview backlight to provide the multiview image within a respective one of the first and second convergence planes.

7. The multiview display of claim 1, wherein the multiview backlight comprises:
   a light guide configured to guide light in a propagation direction along a length of the light guide; and
   a plurality of multibeam elements spaced apart from one another along the light guide length, a multibeam element of the multibeam element plurality having a size comparable to a size of a light valve of the light valve array and being configured to scatter out from the light guide a portion of the guided light as the directional light beams.

8. The multiview display of claim 7, wherein the multibeam element comprises one or more of a diffraction grating, a micro-reflective element, and a micro-refractive element optically connected to the light guide, the diffraction grating being configured to diffractively scatter out the portion of the guided light, the micro-reflective element being configured to reflectively scatter out the portion of the guided light, and the micro-refractive element being configured to refractively scatter out the portion of the guided light.

9. A multiview display system comprising the multiview display of claim 1, the multiview display system further comprising a head tracker configured to determine a distance between the multiview display and a user, wherein distance between the multiview backlight and the light valve array is configured to be adjusted according to the determined distance between the multiview display and the user to shift the convergence plane location to correspond to a location of the user relative to the multiview display.

10. A multiview display system comprising:
- a multiview backlight configured to provide directional light beams having different principal angular directions corresponding to respective different view directions of different views of a multiview image;
- an array of light valves configured to modulate the directional light beams to provide the multiview image at a convergence plane of the multiview display system; and
- a head tracker configured to determine a distance of a user from the multiview display system,
- wherein a distance between the multiview backlight and the light valve array is configured to be adjustable according to the determined user distance to shift a location of the convergence plane to correspond to the determined user distance.

11. The multiview display system of claim 10, wherein an inter-view spacing of the different views at the convergence plane is configured to remain constant as the convergence plane is shifted, and wherein the inter-view spacing within the convergence plane is commensurate with an inter-ocular distance for the user.

12. The multiview display system of claim 10, wherein the multiview backlight is a first multiview backlight of the multiview display system at a first distance from the light valve array, the multiview display system further comprising a second multiview backlight at a second distance from the light valve array, the first distance being different from the second distance, and wherein the convergence plane location is configured to be shifted by selectively activating one of the first multiview backlight and the second multiview backlight.

13. The multiview display system of claim 10, wherein the multiview backlight further comprises:
- a light guide configured to guide light in a propagation direction along a length of the light guide; and
- a plurality of multibeam elements spaced apart from one another along the light guide length, a multibeam element of the multibeam element plurality having a size comparable to a size of a light valve of the light valve array and being configured to scatter out from the light guide a portion of the guided light as the directional light beams.

14. The multiview display system of claim 10, wherein the head tracker comprises one or more of a plurality of cameras configured to determine user distance using disparity estimation and a time-of-flight sensor configured to determine user distance using a propagation time of a signal reflected by the user.

15. A method of multiview display operation, the method comprising:
- emitting light using a multiview backlight as directional light beams having different principal angular directions corresponding to respective different view directions of a multiview image, the directional light beams converging at points within a convergence plane corresponding to locations of different views of the multiview image;
- modulating the directional light beams using an array of light valves to provide the different views of the multiview image at the convergence plane; and
- adjusting a distance between the multiview backlight and the light valve array to shift a location of the convergence plane relative to the multiview display.

16. The method of multiview display operation of claim 15, wherein emitting light using a multiview backlight comprises:
- guiding light in a light guide as guided light; and
- scattering a portion of the guided light out of the light guide as the directional light beams using an array of multibeam elements, a size of a multibeam element of the multibeam element array being comparable to a size of a light valve of the light valve array.

17. The method of multiview display operation of claim 16, wherein the multibeam element comprises one or more of a diffraction grating, a micro-reflective element, and a micro-refractive element optically connected to the light guide, the diffraction grating diffractively scattering out the portion of the guided light, the micro-reflective element reflectively scattering out the portion of the guided light, and the micro-refractive element refractively scattering out the portion of the guided light.

18. The method of multiview display operation of claim 15, wherein adjusting the distance between the multiview backlight and the light valve array comprises mechanically moving the multiview backlight relative to the light valve array.

19. The method of multiview display operation of claim 15, further comprises determining a distance of a user from the multiview display using a head tracker and adjusting the distance between the multiview backlight and the light valve array to shift the convergence plane location to correspond to the determined user distance.

20. The method of multiview display operation of claim 19, wherein determining the distance of the user from the multiview display using a head tracker comprises one or more of:
- capturing an image of the user using a plurality of cameras and employing disparity estimation to determine the distance of the user from the multiview display; and
- employing a time-of-flight sensor to determine the distance of the user from the multiview display from a propagation time of a signal emitted by the time-of-flight sensor and reflected by the user.

* * * * *